Patented Aug. 12, 1941

2,252,117

UNITED STATES PATENT OFFICE 2,252,117

BENZOIC ACID PURIFICATION

Courtney Conover, St. Louis, Mo., assignor to Monsanto Chemical Company, St. Louis, Mo., a corporation of Missouri No Drawing. Original application June 16, 1930, Serial No. 461,659. Divided and this application September 5, 1939, Serial No. 293,406

7 Claims. (Cl. 202—46)

This invention relates to the purification of benzoic acid containing acid impurities and it has particular application to the separation of small amounts of phthalic and maleic acids from a crude benzoic acid product.

Benzoic acid made from phthalic acid invariably contains a small amount of phthalic acid and may contain some maleic acid impurities. (The term "phthalic acid" as used herein is to be understood as contemplating either phthalic acid or the anhydride or a mixture of both.) Although the amount of phthalic acid impurities present in such crude benzoic acid product may be small and indeed insufficient to have any harmful effect, the demands of the trade are such as to require a product containing only minute amounts of these impurities.

Heretofore it has been suggested that phthalic acid be separated from benzoic acid by precipitating the former from a gaseous mixture. It has also been suggested that benzoic acid be purified by treating the crude solid material with a solution of bisulphite. While these processes improve a product containing large amounts of impurities they are inadequate for the purpose of separating amounts of impurities, particularly phthalic acid, which do not exceed 1% of the total.

One object of this invention is to provide a method of purifying crude benzoic acid containing acid impurities whereby a product is obtainable which for practical purposes is absolutely pure.

This invention likewise contemplates a commercially feasible and readily adoptable process for removing phthalic acid impurities from a benzoic acid product whereby the amount of such phthalic acid impurity may be reduced to negligible proportions.

Benzoic acid is manufactured commercially by various methods. Among these, the processes utilizing phthalic acid or its salts as a raw material are attractive but suffers the disadvantage of offering a difficult problem in the refining of the crude product. Moreover inasmuch as benzoic acid produced by other than the phthalic acid process contains no phthalic acid the presence thereof is prejudicial from a marketing standpoint even though its presence is not harmful.

I have found that the quality of benzoic acid made from phthalic acid may be improved very materially, to obtain products of almost any degree of purity if one subjects fluid benzoic acid to the selective purifying action of an aqueous medium. One convenient way of effecting this object is to steam distill benzoic acid and subsequently condense the vapors whereby distinct layers of benzoic acid and water are formed which may be separated conveniently by decantation. The aqueous layer is thereby brought into equilibrium with the liquid and will be found to contain both phthalic and benzoic acids. However, the ratio of phthalic acid to benzoic acid which is dissolved is substantially greater than that of the product remaining undissolved. Thus, a crude product containing 1% phthalic acid may be refined by one such treatment to produce a product containing less than .05% phthalic acid. It is to be noted that the resulting product may be subjected to a second purification treatment in which case the amount of phthalic acid may be reduced to a smaller amount. In this way I have been able to prepare benzoic acid containing less than .001% phthalic acid.

In lieu of the steam distillation one may heat the crude benzoic acid to render it molten and subsequently agitate it with a quantity of pure water or water saturated with benzoic acid whereby the selective dissolution of phthalic acid is effected. The degree of equilibrium attained between the aqueous phase and the molten benzoic acid phase is, of course, a function of the extent of agitation. Although benzoic acid melts well above the boiling point of water at atmospheric pressure, when benzoic acid is heated in the presence of an excess of water it melts below the boiling point, the precise melting point thereof being dependent upon its purity. For example, a mixture of water and benzoic acid containing substantial amounts of phthalic acid melts below 90°. As the purity of benzoic acid increases the melting point rises, but in no case exceeds the boiling point of the aqueous mixture.

Whether one distills the crude benzoic and separates the two liquid layers or agitates the molten benzoic acid in the presence of water the principles upon which this invention is founded are the same, namely the selective dissolution of the acid impurities by means of an aqueous medium. Although I prefer to employ the steam distillation process since it enables one to effect simultaneously the separation of non-volatile impurities and affords a continuous, convenient mode of operation, satisfactory results may be obtained without the steam distillation step.

A detailed description of one method of practicing this invention is hereinafter set forth: A quantity of crude benzoic acid is steam distilled from a molten mass maintained at 145° C.–165° C. The fraction which condenses above 101° C.–103° C. is permitted to form into two layers; an aqueous layer and a molten benzoic acid layer. The aqueous layer is returned continuously to the receptacle containing the crude material undergoing steam distillation. One should adjust the condensing temperature to obtain a condensate consisting essentially of equal amounts by weight of water and benzoic acid.

In general, since the volatility of phthalic anhydride increases with the temperature one should maintain as low a temperature as is otherwise practicable, having due regard for the fact that the lower the temperature of the crude product undergoing steam distillation the more steam is required which in turn, when condensed, will result in the dissolution of proportionately greater amounts of benzoic acid products.

It is advantageous to add a small quantity of a basic material such as sodium carbonate to the crude benzoic acid before steam distillation, the amount utilized being in slight excess of the mol equivalent of phthalic acid present in the charge, substantially as described in my copending application Serial Number 438,632, now Patent No. 1,937,383.

By proceeding as described hereinabove, a crude product which contains 6½% of phthalic acid may be refined by a single operation to one containing .8% phthalic acid. The resulting product can be treated a second time to obtain one in which the phthalic acid is reduced to less than .03%. I have repeated these refining operations and have obtained products containing imperceptible amounts of phthalic acid.

While many methods for refining benzoic acid have been suggested heretofore, particularly for the removal of phthalic acid impurities, the present process affords a process which is more easily adapted to commercial practices and does not require the careful control or skilled supervision necessitated by the former processes. Although I have described in detail an embodiment of my invention involving the use of steam distillation, it will be apparent from the description herein that the invention is not so limited but contemplates broadly the use of an aqueous medium for the selective dissolution of phthalic acid from benzoic acid.

This application is a division of my co-pending application, Serial No. 461,659, filed June 16, 1930, now Patent No. 2,189,726, dated February 6, 1940.

What I claim is:

1. The method of separating small amounts of phthalic acid impurities from benzoic acid which comprises steam distilling the benzoic acid, condensing the vapors whereby two liquid layers are formed, one consisting essentially of relatively pure benzoic acid, the other consisting essentially of a water solution of benzoic and phthalic acids, returning the water layer to the crude product undergoing steam distillation and isolating the benzoic acid layer.

2. The method of separating small amounts of phthalic acid from benzoic acid which comprises adding a small amount of an inorganic basic material, capable of reacting with phthalic acid, to the crude benzoic acid, steam distilling the resulting mixture, condensing the vapors under conditions whereby two liquid layers are formed one consisting essentially of relatively pure benzoic acid and the other consisting essentially of a water solution of the acids and separating the layers.

3. The method as defined in claim 2, further characterized by the fact that the water layer is returned to the material undergoing distillation.

4. The method of purifying crude benzoic acid containing small amounts of phthalic acid impurities which comprises steam distilling crude benzoic acid while maintaining the same at 140–165° C., condensing the vapors at 101–103° C. whereby a condensate consisting of two liquid layers is formed, one layer being relatively pure benzoic acid and the other a water solution of the acids and finally separating the layers.

5. The method as defined in claim 4 wherein the condensing temperature is such as to afford a condensate the layers of which are of substantially equal volume and wherein the aqueous layer is returned continuously to the crude material undergoing steam distillation.

6. In the purification of benzoic acid containing small amounts of phthalic acid the steps which comprise steam distilling the crude benzoic acid, condensing the vapor mixture under conditions whereby two liquid layers are formed, the one consisting essentially of benzoic acid, the other consisting of water containing phthalic acid and benzoic acid dissolved therein, and separating the water layer from the benzoic acid layer.

7. The method of separating small amounts of water soluble organic acid impurities from crude benzoic acid which comprises adding to the crude benzoic acid an inorganic basic material in an amount approximately equivalent to the acid impurities present in the benzoic acid, steam distilling the mixture and condensing the vapors from the steam distillation under conditions whereby a molten benzoic acid layer and an aqueous layer are formed and finally separating the liquid layers.

COURTNEY CONOVER.

CERTIFICATE OF CORRECTION.

Patent No. 2,252,117.   August 12, 1941.

COURTNEY CONOVER.

It is hereby certified that error appears in the printed specification of the above numbered patent requiring correction as follows: Page 2, second column, lines 4 and 8, claim 1; line 16-17, claim 2; line 30, claim 4, and lines 43 and 46, claim 6, before the word "benzoic" insert --molten--; same page and column, line 15, claim 2, after "formed" insert a comma; line 17, same claim, for "acid and the" read --acid, the--; line 18, for "acids and separating the" read --acids, and separating the two liquid--; line 31, claim 4, before "layers" insert --two liquid--; line 58, claim 7, for the words "liquid layers" read --molten benzoic acid layer from the aqueous layer--; and that the said Letters Patent should be read with this correction therein that the same may conform to the record of the case in the Patent Office.

Signed and sealed this 14th day of October, A. D. 1941.

(Seal)   Henry Van Arsdale,
Acting Commissioner of Patents.